United States Patent
Bhave

(10) Patent No.: US 11,566,900 B2
(45) Date of Patent: Jan. 31, 2023

(54) MEMS ROTATION RATE SENSOR

(71) Applicant: Purdue Research Foundation, West Lafayette, IN (US)

(72) Inventor: Sunil Bhave, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/810,650

(22) Filed: Mar. 5, 2020

(65) Prior Publication Data

US 2020/0284584 A1 Sep. 10, 2020

Related U.S. Application Data

(60) Provisional application No. 62/814,342, filed on Mar. 6, 2019.

(51) Int. Cl.
*G01C 19/5776* (2012.01)
*G01C 19/5677* (2012.01)
*G01C 19/56* (2012.01)

(52) U.S. Cl.
CPC ......... *G01C 19/5776* (2013.01); *G01C 19/56* (2013.01); *G01C 19/5677* (2013.01)

(58) Field of Classification Search
CPC ............ G01C 19/5776; G01C 19/5677; G01C 19/5691; G01C 19/661; G01C 19/72; G01C 19/721; G01C 19/722; G01C 19/727; G01C 19/56
See application file for complete search history.

(56) References Cited

U.S. PATENT DOCUMENTS

| | | | | |
|---|---|---|---|---|
| 4,661,964 A | * | 4/1987 | Haavisto | G01C 19/727 356/461 |
| 5,327,214 A | * | 7/1994 | Asami | G01C 19/72 356/464 |
| 5,327,215 A | * | 7/1994 | Bernard | G01C 19/725 356/461 |
| 5,872,877 A | * | 2/1999 | Haavisto | G01C 19/727 385/15 |
| 2010/0328673 A1 | * | 12/2010 | Carothers | G01C 19/72 356/460 |
| 2015/0168441 A1 | * | 6/2015 | Hutchison | G01P 15/14 356/460 |

(Continued)

OTHER PUBLICATIONS

Xiyuan Lu et al., "High-Frequency and High-Quality Silicon Carbide Optomechanical Microresonators", Scientific Reports, Nov. 20, 2015.*

(Continued)

*Primary Examiner* — Helen C Kwok
(74) *Attorney, Agent, or Firm* — Piroozi-IP, LLC

(57) ABSTRACT

A sensor for measuring rate of rotation is disclosed which includes a disk resonator, an anchor coupled to the disk resonator and further coupled to a substrate, and an optical waveguide wrapping around at least a portion of the perimeter of the disk resonator, the optical waveguide having an input end and an output end, wherein the disk resonator is configured to expand radially when subject to a rotational input, and wherein said radial expansion is adapted to cause a change in an optical signal passing through the optical waveguide.

8 Claims, 8 Drawing Sheets
(1 of 8 Drawing Sheet(s) Filed in Color)

(56) References Cited

U.S. PATENT DOCUMENTS

| | | | |
|---|---|---|---|
| 2016/0069686 A1* | 3/2016 | Lee | G01C 19/661 |
| | | | 356/460 |
| 2016/0069687 A1* | 3/2016 | Ciminelli | G01C 19/727 |
| | | | 356/461 |
| 2016/0266110 A1* | 9/2016 | Ozdemir | G01N 15/1463 |
| 2019/0011261 A1* | 1/2019 | Taurel | G02B 6/29341 |
| 2020/0173779 A1* | 6/2020 | Freeman | G01C 19/5776 |

OTHER PUBLICATIONS

X. Sun et al., "High-Q silicon optomechanical microdisk resonators at gigahertz frequencies," Applied Physics Letters, 100, 173116 (2012).

A. G. Krause et al., "A high-resolution microchip optomechanical accelerometer," Nature Photonics, 6, 768-772 (2012).

Siddharth et al., "A silicon nitride optomechanical oscillator with zero flicker noise," 25th IEEE International Conference on Micro Electro Mechanical Systems (MEMS 2012), Paris, France, Jan. 29-Feb. 2, 2012, pp. 19-22.

Matthew J. Storey et al., "Selective transduction of wine-glass vibration mode using differential optomechanics," 18th International Conference on Solid-State Sensors, Actuators and Microsystems (Transducers'15), Anchorage, AK, Jun. 21-25, 2015.

\* cited by examiner

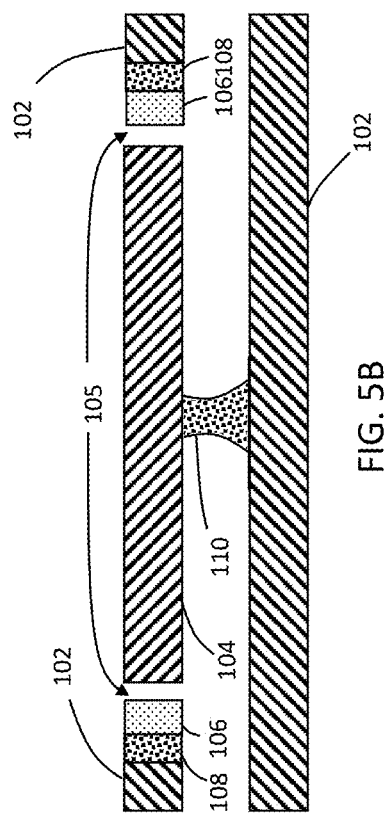
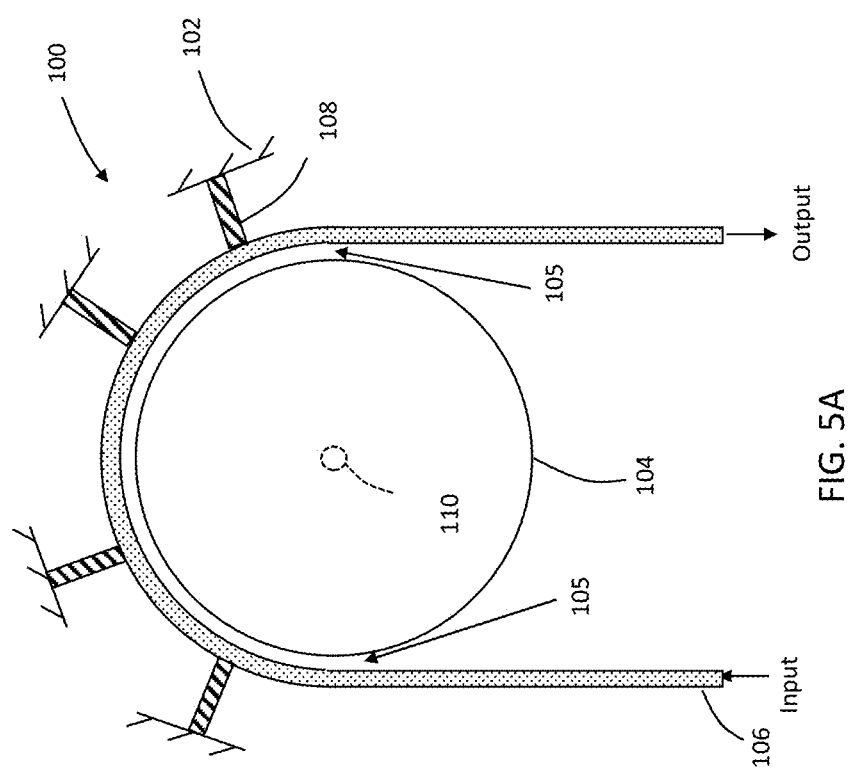

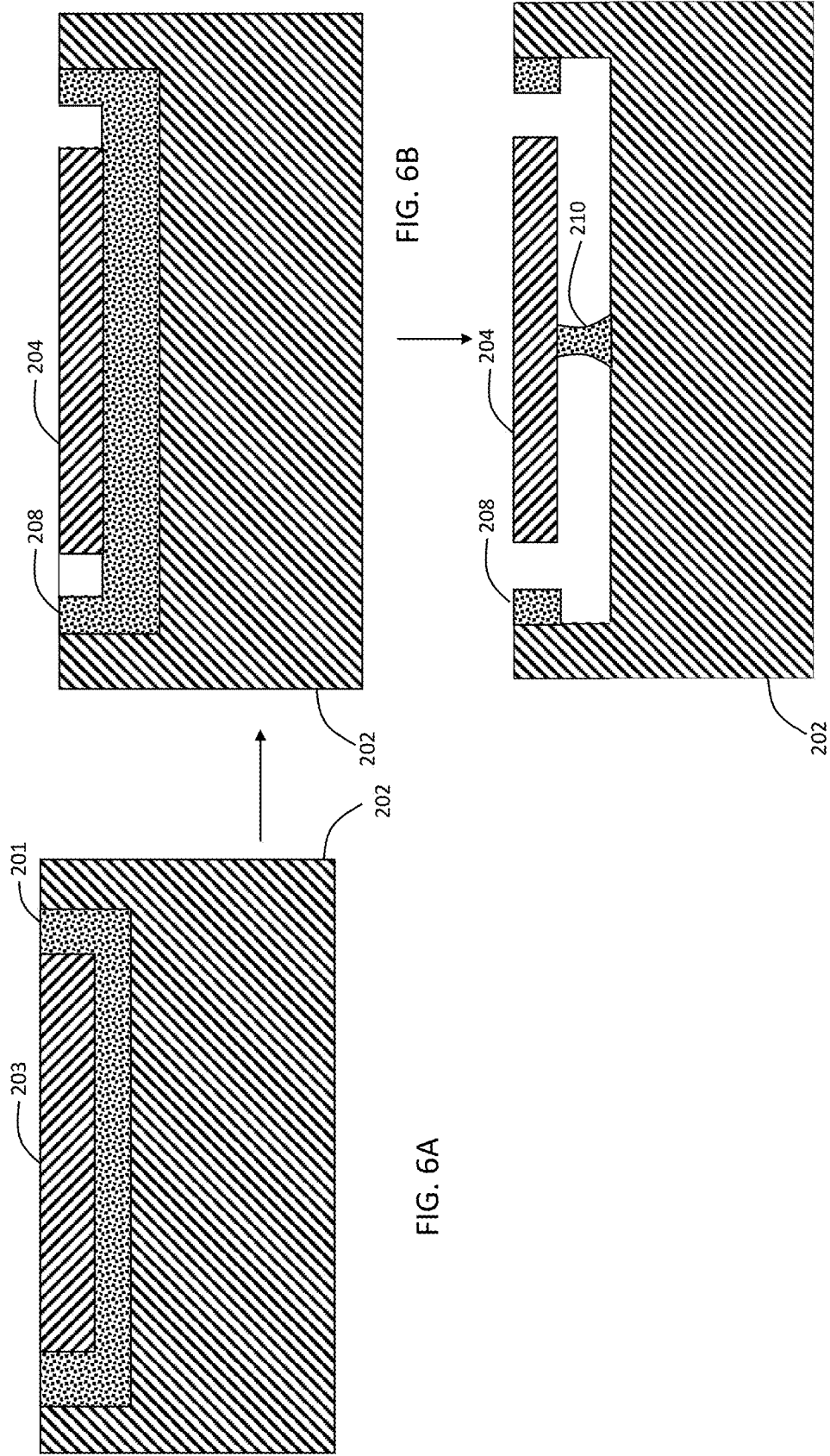

MEMS ROTATION RATE SENSOR

CROSS-REFERENCE TO RELATED APPLICATIONS

The present patent application is related to and claims the priority benefit of U.S. Provisional Patent Application Ser. No. 62/814,342 filed Mar. 6, 2019 the contents of which are hereby incorporated by reference in its entirety into the present disclosure.

STATEMENT REGARDING GOVERNMENT FUNDING

The subject matter of the present disclosure was not made with government support.

TECHNICAL FIELD

The present disclosure relates to inertial sensors, and more specifically to micro-electromechanical system (MEMS) devices which measure linear acceleration and angular rotation rate.

BACKGROUND

This section introduces aspects that may help facilitate a better understanding of the disclosure. Accordingly, these statements are to be read in this light and are not to be understood as admissions about what is or is not prior art.

A typical barebones MEMS vibratory gyroscope requires four electrodes, two for differential oscillation of a proof-mass along the drive axis, and two for differential sensing of Coriolis acceleration along the sense axis. However, gyroscope architectures today have significantly large number of electrodes which are considered necessary for frequency tuning, mode-matching, quadrature error correction, in-phase error correction, force-feedback and self-test, all with their own electrostatic gaps. While each gap serves an important purpose, these gaps are significant liability in large external shock and vibration situations, as small change to each gap directly affects gyroscope scale-factor and bias stability.

Therefore, improvements are needed in the field of angular rotation rate sensors or gyroscopes.

SUMMARY

A sensor for measuring rate of rotation is disclosed. The sensor includes a disk resonator, an anchor coupled to the disk resonator and further coupled to a substrate, and an optical waveguide wrapping around at least a portion of the perimeter of the disk resonator. The optical waveguide includes an input end and an output end. The disk resonator is configured to expand radially when subject to a rotational input. The radial expansion is adapted to cause a change in an optical signal passing through the optical waveguide.

In addition, a method of measuring rotational rate of an object by a sensor is also disclosed. The method includes applying light to an input of a waveguide partially wrapped around a disk resonator. The method also includes applying a centripetal force by way of rotation at a rate to the disk resonator. Furthermore, the method includes measuring a change in output power of light exiting from an output of the waveguide by comparing to light passing through a reference. Additionally, the method includes determining the centripetal force from the measured change in output power. The method also includes determining the rotation rate of the disk resonator.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 5A is a top view of the rotation rate sensor of the present disclosure.

FIG. 5B is a cross sectional view of the rotation rate sensor of the present disclosure.

FIGS. 6A, 6B, and 6C are cross sectional views of steps in fabricating the rotation sensor of the present disclosure.

DETAILED DESCRIPTION

Figure 1:
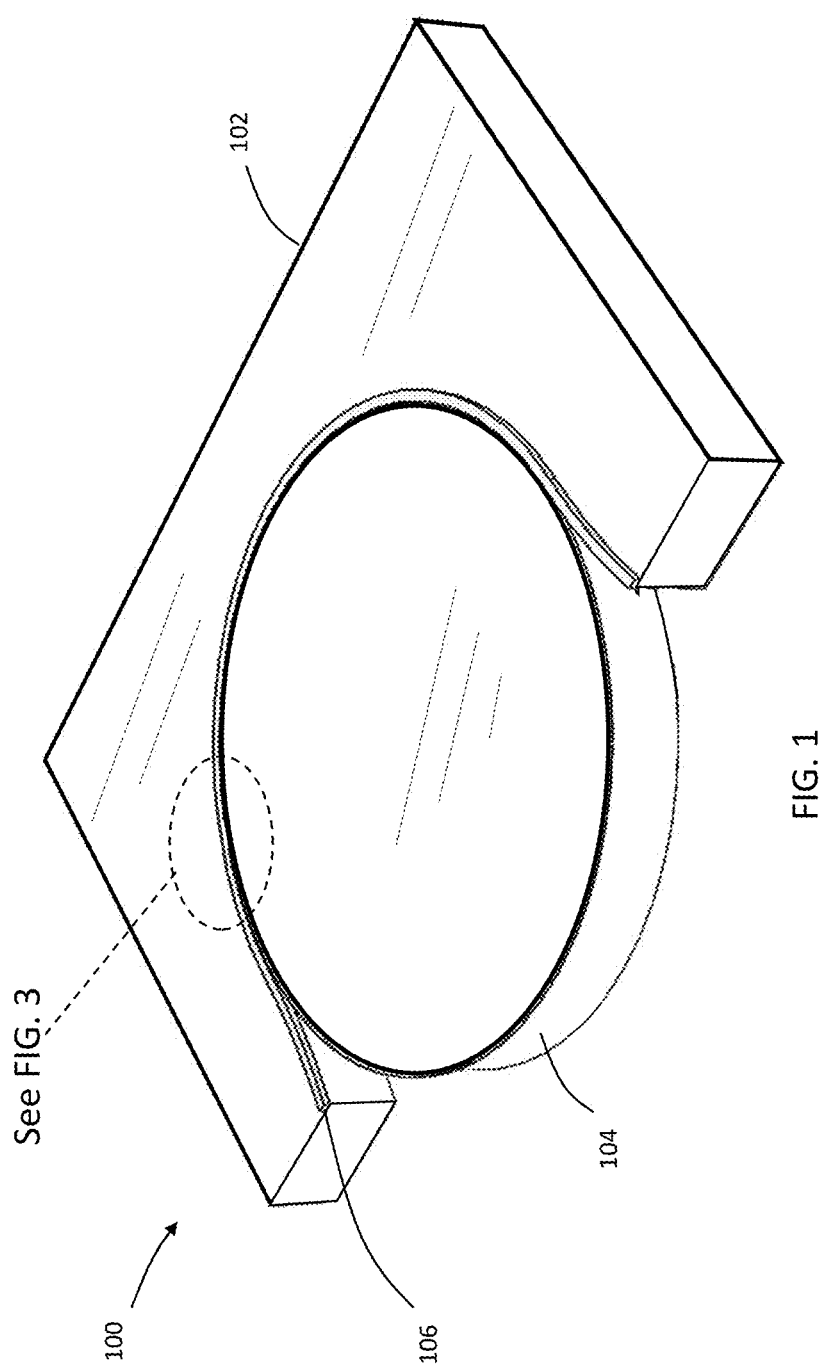
FIG. 1 is a perspective view of a rotation rate sensor, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figure 2:
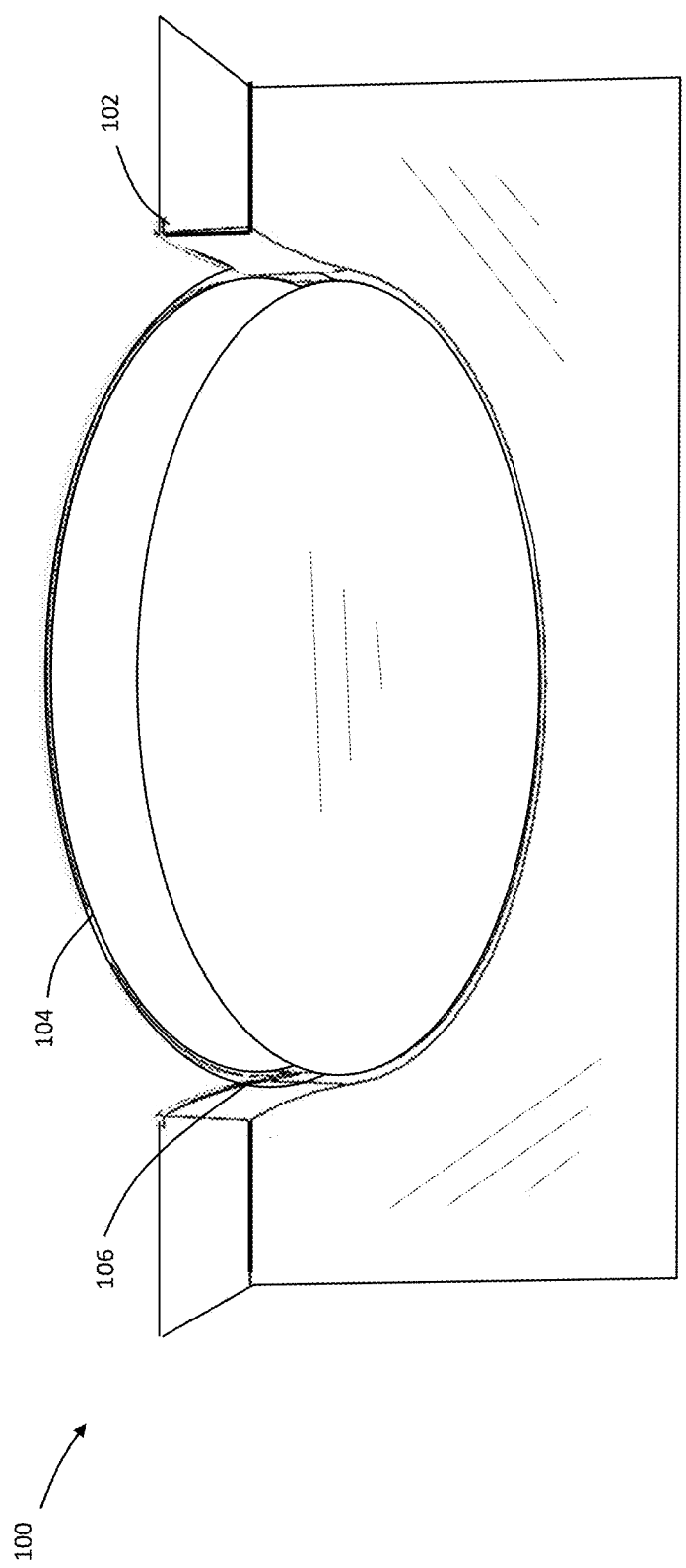
FIG. 2 is another partial perspective view of the rotation rate sensor, according to the present disclosure.

The present disclosure provides an Optical Radiation-transduced Centripetal Accelerometer (ORCA) sensor to measure high-dynamic range rotation in harsh environments. The disclosed sensor comprises a silicon-based (e.g., silicon nitride) disk resonator coupled to an optical waveguide to measure Centripetal acceleration due to rotation rate. Referring to FIGS. 1 and 2, perspective views of an ORCA sensor 100 according to the present disclosure are provided. The ORCA sensor 100 includes a backing 102 (also referred to herein as the substrate) and a disk 104 (also referred to herein as the resonator disk). Between the backing 102 and the disk 104 is a gap in which a waveguide 106 can be incorporated. The disk 104 and the backing 102 can be made from a variety of different semiconductor materials known to a person having ordinary skill in the art. For example, the disk 104 can be made of silicon nitride and the backing 102 can be made from silicon dioxide. Not shown in FIG. 1 I an anchor 110, see FIGS. 5B, which can be made from the same material as the disk 102. The disk 104 radially expands when subject to an input rotation about the anchor 110. This causes circumference change, which is measured increased precision by optical interrogation using the wrap-around waveguide 106. The optical signal is coupled in and out of the ORCA sensor 100 using inverse-tapered couplers, which provide index matching and mode matching for low insertion loss coupling.

The waveguide 106 is critically coupled to the disk resonator 104. In other words, light at a given wavelength, couples to the waveguide 106 and begins circulating partially around perimeter of the disk resonator 104. At a resonant frequency, light eventually dissipating inside the disk resonator 104. At any wavelength other that the resonant wavelength the light passes on to the waveguide's output port (see FIG. 5A). When the disk resonator 104 radially expands or contracts due to centripetal force, there is a circumference change in the disk resonator 104. This modulation of the circumference, leads to a modulation of the light that is coupled to the disk resonator 104. Thus there is an amplitude modulation of the light, which is proportional to the centripetal force, which itself is proportional to angular rotation rate squared.

In certain embodiments the disk 104 (also referred to herein as the disk resonator) has a radius in the range of about 30 μm to about 5000 μm. The disk resonator may also have a thickness in the range of about 150 nm to about 200 μm. The waveguide is defined by a gap in range of about 100 nm to about 500 nm.

Figure 3:
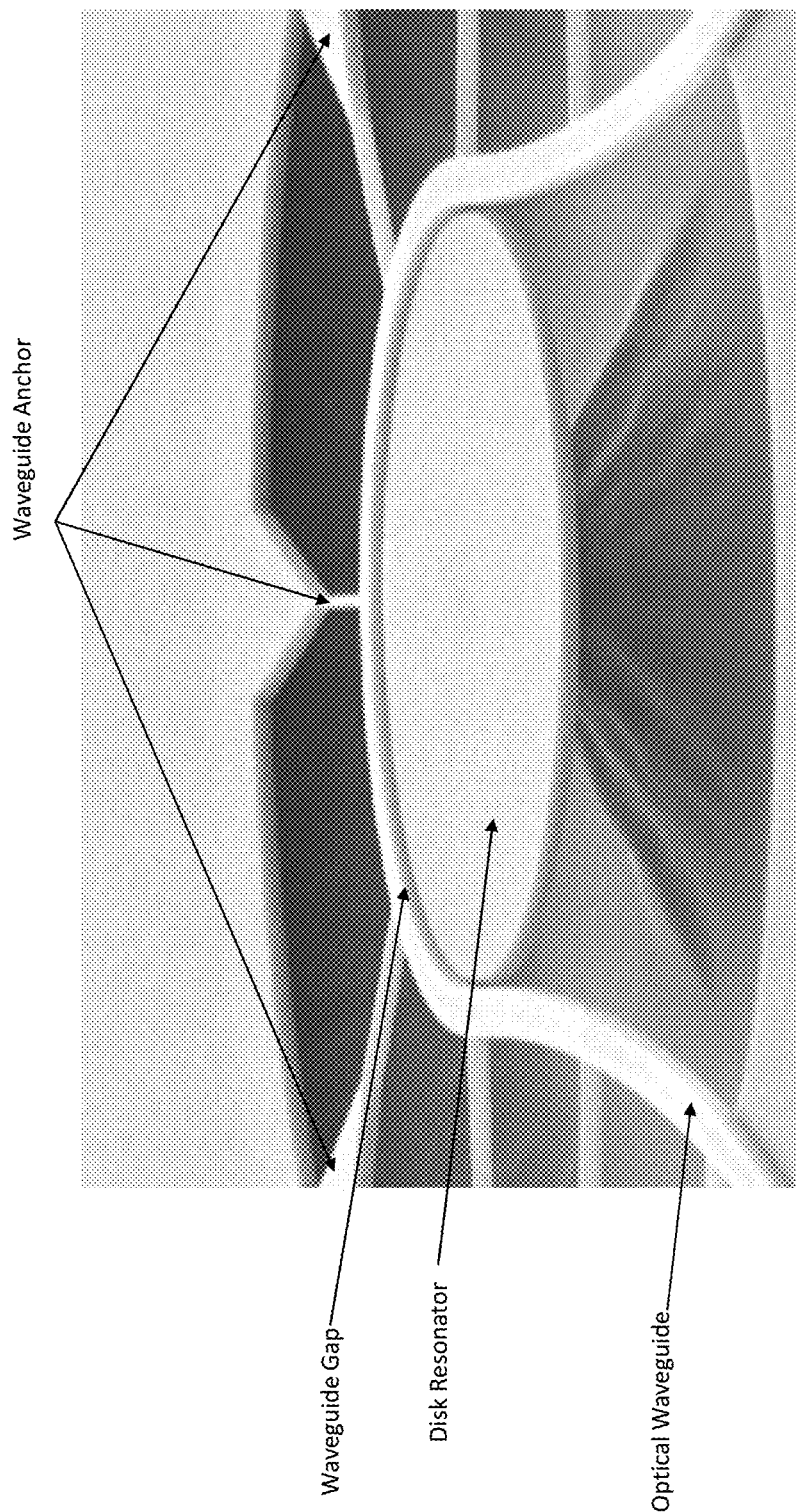
FIG. 3 is a scanning electron microscope image of a rotation rate sensor of prior art.

Referring to FIG. 3, a scanning electron microscope image of a disk resonator is provided showing the disk resonator, a waveguide gap around the disk resonator, a waveguide around the gap, and waveguide anchors coupling the waveguide to the substrate.

Figure 4:
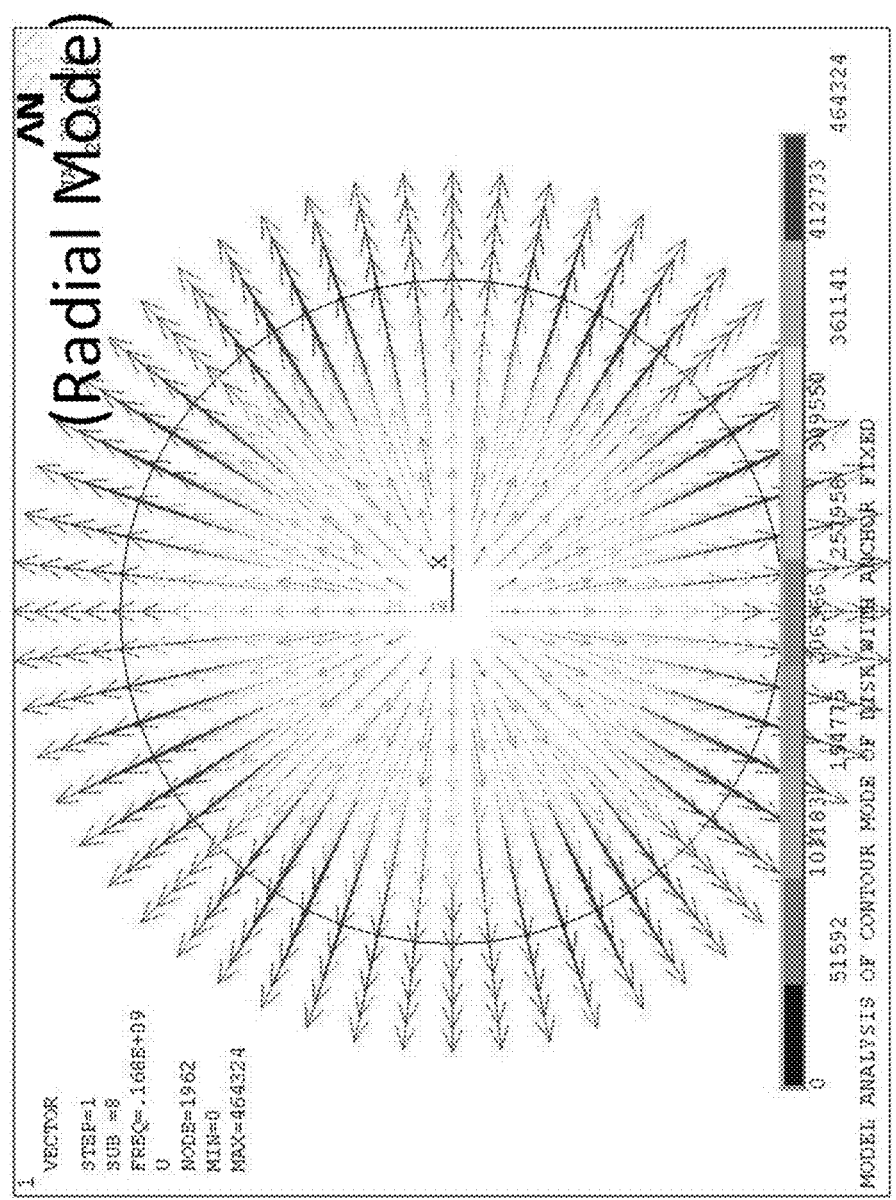
FIG. 4 is an expansion contour map of a resonator disk of the rotation rate sensor of the present disclosure.

Referring to FIG. 4, an expansion contour map of the resonator disk 104 of the ORCA sensor 100 according to the present disclosure is presented. The numbers are provided as reference only. The arrows indicate the radial expansion due to a rotational input. The center shows little to no expansion, while the perimeter of the disk resonator shows most expansion.

The disclosed ORCA sensor 100 has no oscillating elements. Under a rotation rate input, the disk expands in the radial direction, similar to dilation of an eye. The radial displacement proportional to square of rotation-rate ($\Omega_z^2$). While the sensor's transfer function is non-linear, angular rate is measured from the ORCA sensor 100 and not angular acceleration. Therefore the sensor does not suffer from double integration error accumulation that occurs in the case of an angular accelerometer, as known by a person having ordinary skill in the art. The ORCA sensor 100 has large bandwidth and dynamic range to operate through in high acceleration environments, such as a projectile launch.

While the Centripetal force is not at radial mode vibration frequency, the mechanical mode has extremely high quality factor for thermo-elastic dissipation ($Q_{TED}$ of about 100 M). Therefore the input referred "Force noise" is extremely small, which enables detection of extremely small rotation rates. Since the radial mode does not have modal degeneracy like the wine-glass modes, the disclosed sensor is not susceptible to an-iso stiffness and an-iso damping challenges of Coriolis vibratory gyroscopes.

The wrap-around waveguide 106 of the disclosed sensor enables efficient, robust and reliable coupling of light to the disk resonator 104. Fabrication process innovation to the silicon-on-insulator (SOI) opto-mechanics platform allows the waveguide to be firmly anchored to the substrate ensuring no flexural modes of the waveguide are present at low enough frequency to couple in external shock and vibration. The radial vibration mode causes a "global" change in circumference and thus path-length change for the light that travels on the disk resonator. Optomechanical transduction efficiency is about 30 dB higher for dispersive coupling, compared to reactive coupling, making it ideal for measuring radial dilation modes compared to wine-glass or translation modes.

Referring to FIG. 5A, another schematic of the ORCA sensor 100 is shown. The ORCA sensor 100 also includes a uniform gap 105; the gap 105 is between the waveguide 106 and the disk resonator 104. The purpose of the gap 105 is to provide coupling between the waveguide and resonator. The uniform gap 105 provides immunity against in-plane translation and wine-glass vibration modes, which have local maxima and minima that will add up to zero phase perturbation in the wraparound waveguide 106.

Referring to FIG. 5B, a side view of the ORCA sensor 100 is shown clearly showing the disposition of the disk 104 and the anchor 110. Again, the disk 104 is mounted on to the anchor 110 allowing it to be displaced (expanded) when subject to a rotational rate of movement in comparison to the wrap-around waveguide 106 which is anchored against the substrate by waveguide anchors 108.

Referring to FIGS. 6A, 6B and 6C steps in a method of making of the ORCA sensor 100 of the present disclosure are presented, according to one embodiment. In FIG. 6A, a substrate 202, e.g., Si, is shown with a layer of silicon nitride 203 and a layer of silicon dioxide 201 atop the substrate 202. Through a standard etching p the silicon nitride layer 203 and the silicon dioxide layer 201 are etched to reveal a disk resonator 204 as well as waveguide anchors 208. By further etching, excess material is removed and the anchor 210 is revealed which couples the resonator disk 204 to the substrate 202. As shown in FIGS. 6A-6C, the disk resonator 204 can be of one material, e.g., silicon nitride, while the anchor 210 and the waveguide anchors 206 can be of another material, e.g., silicon dioxide, and the substrate 202 can be of yet another material, e.g., silicon.

To further describe the operation of the ORCA sensor 100, the following mathematical relationships are provided. Newton's law of motion for particle of mass m is given by:

$$F = m\frac{d^2r}{dt^2}$$

where F is the Centripetal force on mass m, rotating at a rate of dr/dt around a center with a radius r. To express this in terms of a reference frame rotating with angular velocity ω, the coordinate system is switched to a rotating coordinate system, as provided below:

$$F = m\frac{\delta^2 r}{\delta t^2} + m\frac{\delta \omega}{\delta t} \times r + 2m\omega \times \frac{\delta r}{\delta t} + m\omega \times (\omega \times r)$$

where the first term is the linear acceleration in the rotating frame, but the other three terms are of particular interest in the sense they can be directly used to measure ω. The second term is known as Euler acceleration. It is a measure of rate of change of angular velocity, and can be measured using MEMS Angular Accelerometers. However, Angular Accelerometers are not used in inertial measurement systems because of the double integration necessary to estimate angle, which leads to quadratic accumulation of integration error over time. The $3^{rd}$ term is Coriolis acceleration. This method is used by all MEMS vibratory gyroscopes to measure ω. The Coriolis acceleration is enhanced by modulating dr/dt at a known frequency with extremely large amplitude. The 4$^{th}$ term is Centripetal acceleration. The centripetal force points directly away from the axis of rotation. It is proportional to the square of the rotation rate. It can be measured using an accelerometer, but unlike Euler acceleration, it directly measures angular rate and does not require double integration to estimate angle. The square term means the sensor is non-linear, however systematic calibration can be easily implemented to overcome the non-linearity.

The ORCA sensor 100 of the present disclosure operates on the following principle: The centripetal force on a disk with radius R and mass $m_{eff}$ due to an input angular rotation rate $\Omega_Z$ is given by $$F_{Cetripetal} = m_{eff} \cdot R \cdot \Omega_Z^2$$

where $\Omega_Z$ is is the angular rotation rate, d
R is the radius of the disk 104.

Solving for radial displacement of the disk, r $$k_{radial} \cdot r = m_{eff} R \cdot \Omega_Z^2$$

thus $$r = \frac{\Omega_Z^2}{\omega_{radial}^2} \cdot R$$

and $$\frac{r}{R} = \frac{\Omega_Z^2}{\omega_{radial}^2}$$

where $\omega_{radial}$ is the vibration frequency of the radial dilation mode of vibration of the disk proof-mass.

If light of wavelength $\lambda$ is coupled to the disk resonator using a waveguide, the fractional change in wavelength will be $$\frac{\Delta\lambda}{\lambda} = \frac{\Omega_Z^2}{\omega_{radial}^2}$$

The smallest $\Delta\lambda$ that can be measured depends on the laser linewidth and stability, and the noise of the photodetector. Note that $\Delta\lambda$ [units of meter] does not depend on the narrow coupling gap, and thus external shocks and vibrations that cause the gap to change will not affect the performance of the sensor.

It should be appreciated that the size of the ORCA sensor 100 causes a significant impact on $\Delta\lambda$. This is because, the larger the ORCA sensor 100, the smaller $\omega_{radical}^2$, which is inversely proportional to $\Delta\lambda$, thus the larger $\Delta\lambda$. As a result, the ORCA sensor 100 of the present disclosure has a resonator disk 104 having a radius of between about 30 µm to about 5000 µm. In addition, the material of the disk resonator 104 is of great importance. Silicon nitride has an improved coupling of light from the waveguide 106 to the resonator disk 104, as compared to other materials such as silicon dioxide. Thus, at resonance, more of the light is coupled from the waveguide 106 to the resonator disk 104. With more of the light being coupled, a small change in the resonator disk 104 can result in a much higher sensitivity. Thus the resonator disk 104 of the present disclosure is made of material adapted to provide high optical coupling. As such the initial gap 105 between the disk resonator 104 and the waveguide 106 becomes another important factor in the present disclosure.

Figure 7:
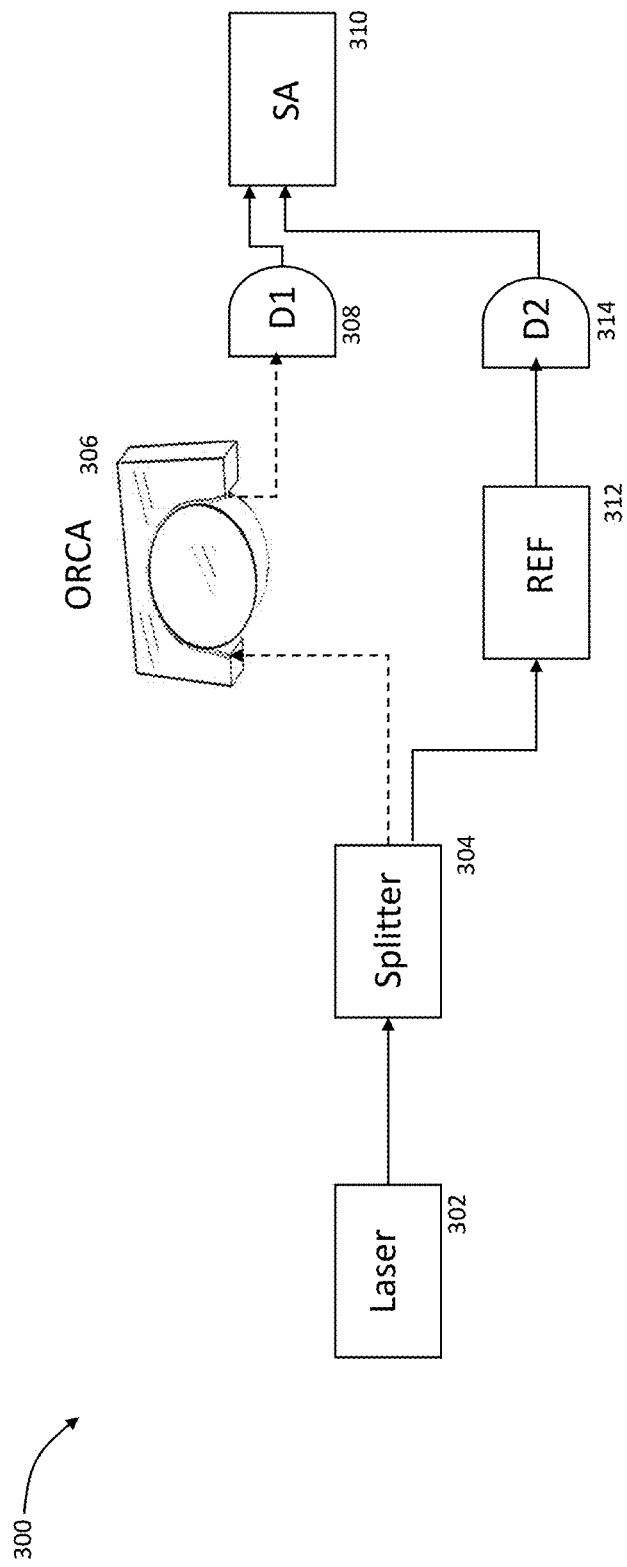
FIG. 7 is a schematic of a system that uses the rotation rate sensor of the present disclosure.

Referring to FIG. 7, an exemplary system 300 is shown where the ORCA sensor 100 is implemented. The system 300 includes a light source 302, e.g., a laser, optically coupled to a splitter 304 which is adapted to split output of the light source 302 into a first and second beams, wherein the first beam is adapted to provide a first power and the second beam is adapted to provide a second power, substantially lower than the first power, e.g., 10% of the first power. The first beam is optically coupled to an ORCA sensor 306 through the input of its waveguide (see FIG. 5A) and wherein the ORCA sensor 306 is adapted to provide optical output from the output of the waveguide (see FIG. 5A) which is optically coupled to a first detector 308. The first detector 308 is coupled to an analyzer 310 adapted to measure the power output of the first detector 308 as a differential power against a reference power provided from a second detector 314 which is coupled to the reference waveguide 312. The reference waveguide 312 is adapted to provide a power reference for the ORCA sensor 306 with immunity to centripetal forces. This reference waveguide 312 is coupled to the splitter 304 receiving the second beam, discussed above. By differentially measuring and normalizing the power output at the first detector 308 and the second detector 314, the analyzer can generate a power reading for the ORCA sensor 306. This power reading changes as the ORCA sensor 306 is subject to a centripetal force and which change is proportional to that force. This change in power is also proportional to $\Delta\lambda$ which can then be used to generate $\Delta\lambda/\lambda$ as provided above.

Figure 8:
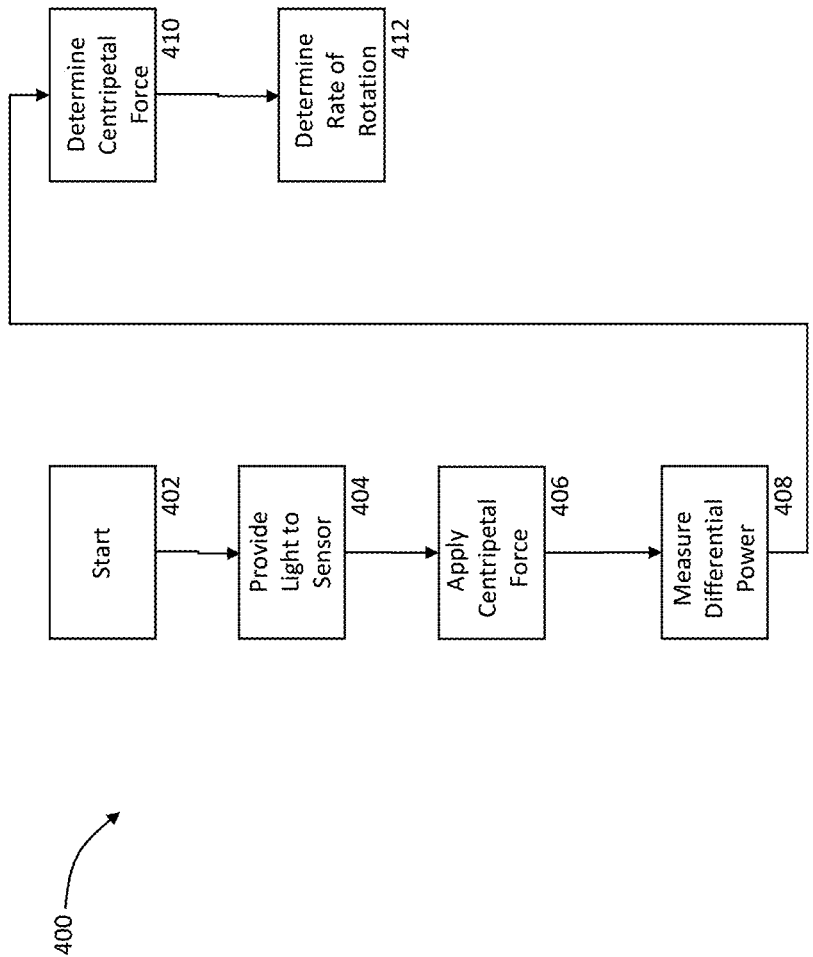
FIG. 8 is a flowchart of a method that uses the rotation rate sensor of the present disclosure.

Referring to FIG. 8, a flowchart of a diagram is shown depicting a method 400 according to the present disclosure. The method begins at block 402. Once the sensor is placed in a system that is configured to be subject to a rotational rate, according to block 404, light is applied to the input of the waveguide, as discussed above, as depicted in block 404. Next, centripetal force is applied by way of a rotational motion, as shown in block 406. As the centripetal force causes a change in the resonator disk, output power of the waveguide is measured and differential power is measured as discussed above, as shown in block 408. From the change in power based on the differential power measurement, $\Delta\lambda/\lambda$ is measured which can be related to measuring the centripetal force, as shown in block 410. From the determined centripetal force, the rate of rotation can be measured, as shown in block 412.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

Those having ordinary skill in the art will recognize that numerous modifications can be made to the specific implementations described above. The implementations should not be limited to the particular limitations described. Other implementations may be possible.

The invention claimed is:

1. A method of measuring rotational rate of movement of an object by a sensor, comprising:
applying light to an input of a waveguide partially wrapped around a disk resonator;

applying a centripetal force by way of rotation at a rate to the disk resonator;

measuring a change in output power of light exiting from an output of the waveguide as a result of radial expansion of the disk resonator due to application of the centripetal force by comparing to light passing through a reference;

determining the centripetal force from the measured change in output power; and determining the rotation rate of the disk resonator, wherein the disk resonator has a radius of between about 30 µm to about 5000 µm, and wherein the disk resonator is separated from the waveguide by a uniform gap of between about 100 nm to about 500 nm.

2. The method of claim 1, wherein the disk resonator comprises silicon nitride.

3. The method of claim 1, wherein the disk resonator comprises silicon dioxide.

4. The method of claim 1, wherein one or more waveguide anchors are adapted to couple the waveguide to a substrate.

5. The method of claim 1, wherein the disk resonator has a thickness of between about 150 nm to about 200 µm.

6. The method of claim 4, wherein the substrate comprises silicon.

7. The method of claim 4, wherein the substrate comprises silicon dioxide.

8. The method of claim 1, wherein change of $\Delta\lambda/\lambda$ is related to the centripetal force relative to the rotational rate, where $\lambda$ represents wavelength of light passing through the waveguide.

* * * * *